(12) United States Patent
Gordon et al.

(10) Patent No.: US 10,927,018 B2
(45) Date of Patent: Feb. 23, 2021

(54) METHOD FOR PURIFICATION OF DRINKING WATER, ETHANOL AND ALCOHOL BEVERAGES OF IMPURITIES

(71) Applicant: Cavitation Technologies, Inc., Chatsworth, CA (US)

(72) Inventors: Roman Gordon, Studio City, CA (US); Igor Gorodnitsky, Marina del Rey, CA (US); Maxim A. Promtov, Tambov (RU); Naum Voloshin, Los Angeles, CA (US)

(73) Assignee: Cavitation Technologies. Inc., Chatsworth, CA (US)

( * ) Notice: Subject to any disclaimer, the term of this patent is extended or adjusted under 35 U.S.C. 154(b) by 0 days.

(21) Appl. No.: 16/711,169

(22) Filed: Dec. 11, 2019

(65) Prior Publication Data

US 2020/0115256 A1    Apr. 16, 2020

Related U.S. Application Data

(62) Division of application No. 15/796,570, filed on Oct. 27, 2017, now Pat. No. 10,781,113.

(51) Int. Cl.
*C02F 1/34* (2006.01)
*B01D 65/08* (2006.01)
(Continued)

(52) U.S. Cl.
CPC ............ *C02F 1/34* (2013.01); *B01D 65/08* (2013.01); *B01F 5/0615* (2013.01);
(Continued)

(58) Field of Classification Search
CPC .... C02F 1/34; C02F 1/001; C02F 1/44; C02F 9/00; C02F 2201/002; C02F 2301/066;
(Continued)

(56) References Cited

U.S. PATENT DOCUMENTS 2,043,713 A * 6/1936 Saywell ............... C12H 1/0408
426/423
3,469,706 A * 9/1969 Kissell .................. B01D 35/02
210/448

(Continued)

FOREIGN PATENT DOCUMENTS

CN          1254010 A    5/2000
WO    WO-2012003815 A2 *  1/2012 ................ C02F 1/34

*Primary Examiner* — Liam Royce
(74) *Attorney, Agent, or Firm* — Kelly & Kelley, LLP

(57) ABSTRACT

A system and method of the purification of drinking water, ethanol and alcohol beverages is based on the action of hydrodynamic cavitation processing of microbiological and chemical contaminants, micro particles and colloidal particles. The fluid flow moves at a high rate through a multi-stage cavitation device and filtration module to generate hydrodynamic cavitation features in the fluid flow. The cavitation features generate changes in the velocity, pressure, temperature, chemical composition and physical properties of the liquid. The cavitation features also prevent the deposition of contaminants upon and remove contaminants from the surface of the filter module, reduce the load on the filter elements and increase the life of the filter module.

11 Claims, 5 Drawing Sheets

(51) Int. Cl.
    *C12H 1/044*     (2006.01)
    *B01F 5/06*     (2006.01)
    *C02F 1/00*     (2006.01)
    *C02F 1/44*     (2006.01)
    *C02F 9/00*     (2006.01)
    *C12H 1/16*     (2006.01)
    *B01D 61/02*     (2006.01)
    *B01D 61/14*     (2006.01)
    *B01D 63/06*     (2006.01)

(52) U.S. Cl.
    CPC ............ *B01F 5/0644* (2013.01); *C02F 1/001* (2013.01); *C02F 1/44* (2013.01); *C02F 9/00* (2013.01); *C12H 1/0408* (2013.01); *C12H 1/16* (2013.01); *B01D 61/02* (2013.01); *B01D 61/14* (2013.01); *B01D 63/06* (2013.01); *B01D 2321/2075* (2013.01); *C02F 2201/002* (2013.01); *C02F 2301/066* (2013.01); *C02F 2301/08* (2013.01); *C02F 2303/04* (2013.01)

(58) Field of Classification Search
    CPC .. C02F 2301/08; C02F 2303/04; B01D 65/08; B01D 61/02; B01D 61/14; B01D 2321/2075; B01D 63/06; C12H 1/0408; C12H 1/16; B01F 5/0615; B01F 5/0644
    See application file for complete search history.

(56) References Cited

U.S. PATENT DOCUMENTS

| | | | |
|---|---|---|---|
| 4,127,332 A * | 11/1978 | Thiruvengadam | B01F 5/0615 366/131 |
| 4,906,387 A * | 3/1990 | Pisani | C02F 1/32 210/748.12 |
| 6,030,535 A * | 2/2000 | Hayashi | B01D 61/04 210/652 |
| 2010/0104705 A1 | 4/2010 | Gordon et al. | |
| 2011/0147231 A1* | 6/2011 | Gordon | C02F 1/463 205/687 |
| 2016/0016834 A1* | 1/2016 | Dahule | C02F 1/30 96/175 |

\* cited by examiner

METHOD FOR PURIFICATION OF DRINKING WATER, ETHANOL AND ALCOHOL BEVERAGES OF IMPURITIES

RELATED APPLICATION

This is a divisional of co-pending U.S. application Ser. No. 15/796,570 filed Oct. 27, 2017.

BACKGROUND OF THE INVENTION

The invention relates to a system and method for purification of drinking water, aqueous solutions of alcohols (alcohol and alcohol beverages—vodka, whiskey, rum, brandy, wine, etc.) and finds numerous applications in alcohol production, food industries and at home. Removable contaminants include micro particles, colloidal particles, microbiological and chemical impurities whose concentration can be decreased to the allowable levels in one pass through the present apparatus. The proposed method generates changes in the fluidic flow's velocity, pressure, temperature, chemical composition and physical properties in order to reduce the concentration of impurities and to increase the lifetime of membranes and filters for cleaning liquids from biological, chemical and mechanical impurities.

In the production of drinking water, ethanol and alcohol beverages, their components (water, ethanol, etc.) are purified by various technologies. Water is typically treated with a reagent method (coagulation, lime-soda), ion exchange resins (Na-cation exchange, cation and anion exchange resins), an adsorption method (using activated carbon), a redox method (de-ironing, ozonization), or membrane filtration (ultrafiltration, reverse osmosis). Ethanol may be purified by multiple distillation, or chemical treatment with various reagents and filtration.

In clarification of wine, hydrophilic colloids (casein, egg white, gelatin, fish glue and others) may be introduced to interact with wine colloids. Insoluble compounds resulting from the interaction of protein and tannin substances form flakes, which, settling on the bottom, carry with them the fine particles suspended in the wine, and make it lighter. Clarification of wine is usually carried out in two stages: agglomeration of particles (coagulation) and precipitation of a solid phase (sedimentation).

After the preparation of alcohol beverages according to a certain recipe, they are filtered to retain the fine particles formed during the purification process. To remove impurities, which give alcohol beverages an unpleasant odor and taste, they are treated with activated carbon. After treatment with activated carbon, alcohol beverages are filtered to remove the smallest particles of coal.

Even after purification in an industrial plant, ethanol and some alcohol beverages, made from ethanol, have low flavor qualities and a sharp odor. This is a consequence of the presence in ethanol of chemical impurities, which impair the organoleptic quality of alcohol beverages.

Alcohol beverages can contain such impurities as Acetaldehyde and/or Acetal, Benzene, Methanol, Fusel Oils (as Isobutyl, Isoamyl and active Amyl), Non Volatile Matter, Heavy Metals and others.

Physical-chemical characteristics of wines are characterized by the content of ethanol, sugars, acids, polyphenols and other components. The number and combination of these substances depend on the organoleptic characteristics of wines. To improve the organoleptic properties of alcohol beverages and drinking water it is necessary to use purification methods and devices, which the consumer can use to improve their quality. The ordinary consumer should be given an opportunity to improve the taste of alcohol beverages to the required quality and purify drinking water. This will be possible if consumers are able to purchase and use simple and reliable home devices for treatment of alcohol beverages and drinking water to improve their organoleptic properties and remove impurities.

Methods of finishing treatment of alcohol beverages through filters of different designs such as flexible membrane and rigid porous septum are quite widespread. The methods of finishing treatment are microfiltration, ultrafiltration, nanofiltration and reverse osmosis.

Microfiltration (commonly abbreviated to MF) is a type of a physical filtration process where a contaminated fluid is passed through a special pore-sized membrane to separate microorganisms and suspended particles from the process liquid. Microfiltration is a process of separating liquid from suspended particles 0.1-100 $\mu$m.

Ultrafiltration (UF) is a variety of membrane filtration in which forces like pressure or concentration gradients lead to a separation through a semipermeable membrane. Ultrafiltration is a membrane separation process and fractionation, concentration of substances, carried out by filtration of the liquid under the action of the pressure difference before and after membrane. Pore size ultrafiltration membranes range from 0.01-0.1 $\mu$m.

Nanofiltration (NF) is a membrane filtration-based method that uses nanometer sized cylindrical through-pores that pass through the membrane at right angles. Nanofiltration membranes have pore sizes ranging from 1-10 nanometers. Dead-end mode for the process of nanofiltration is not used, because such filtering mode inevitably leads to a rapid clogging of the membrane. Thus, the nanofiltration process can only be used in a cross-flow mode of filtration, i.e. in the presence of a flow of fluid moving along the membrane surface and jetting the discharge of the contamination.

Methods of purification of liquids through porous septum (hard microfilters and flexible membrane) are problematic as they cause deposition of particulates, biological sediments, and the formation of a film on the surface of the porous septum in the pores of membranes and microfilters. In the process of purification of liquids through porous septum, microfilters and membranes typically become clogged by suspended particles, organic contaminants, and poorly soluble compounds. Their surface may also become covered with a film of impurities on the pressure side, thus impeding the flow of fluids through a porous septum. This leads to a decrease in the specific performance of microfilters and membranes, reducing their lifetime. To restore the filtration properties of membranes and microfilters they are cleaned by various methods.

Hydrodynamic methods of cleaning porous septum include flushing of external sediments out of the pressure channel with pressurized liquid, gas-liquid emulsion, pulsating flow, backwashing with permeate. In practice, the most widely used method is the washing of the pressure channel of the filter modules with a strong jet of liquid. The washing liquid, which is often the solution itself, is pumped through the filter and membrane apparatus at a higher rate.

The choice of purification method depends on the size and characteristics of particles and substances from which it is necessary to purify the liquid. The smaller the size of particles, associates of molecules and molecules of the substances being removed, and the greater their concentration is, the more complex is the equipment and technology for filtering.

One of the ways to increase the effectiveness and reduce the cost of finishing methods for purification of liquids is preliminary physical processing of liquids to reduce the concentrations of chemical contaminants and changes in their physical-chemical properties.

Methods of hydrodynamic treatment and cavitation treatment of liquids that change their physical-chemical properties are known. Cavitation can be of many origins, including acoustic, hydrodynamic, laser-induced or generated by injecting steam into a cool fluid. Acoustic cavitation requires a batch environment and cannot be used efficiently in continuous processing, because energy density and residence time would be insufficient for a high-throughput. In addition, the effect of acoustic cavitation diminishes with an increase in distance from the radiation source. Treatment efficacy also depends on a container size as alterations in the fluid occur at particular locations, depending on the acoustic frequency and interference patterns.

When a fluid is fed in a flow-through hydrodynamic cavitation device at a proper velocity, cavitation bubbles are formed as a result of the decrease in hydrostatic pressure inside the specially designed passages. When the cavitation bubbles transit into a slow-velocity, high-pressure zone, they implode. Such implosion is accompanied by a localized increase in both pressure and temperature, up to 1,000 atm and 5,000° C., and results in the generation of local jet streams, shock waves and shearing forces. The release of a significant amount of energy activates atoms, ions, molecules and radicals located in the bubbles and/or the adjacent fluid and drives chemical reactions and processes. The bubble implosion can be coincidental with the emission of light, which catalyzes photochemical reactions. (Suslick, 1989; Didenko et al., 1999; Suslick et al., 1999; Young, 1999; Gogate, 2008; Moholkar et al., 2008; Zhang et al., 2008.)

U.S. Patent Applications Publication Nos. 2006/0081541 (Kozyuk) and 2007/0102371 (Bhalchandra et al.), and U.S. Pat. Nos. 5,393,417 and 5,326,468 to Cox, U.S. Pat. No. 9,403,697 to McGuire disclose methods and apparatuses that use cavitation for treatment and purification of water and other fluids.

Russian Patent No. 2316481 to Sister describes a method of purification of wastewater from surface-active substances, in which the water is subjected to ultrasonic cavitation at a sound radiation intensity of 1.5-3 W/cm$^2$.

Complex physical and chemical processes occur in the water subject to cavitation treatment. Its hardness decreases, i.e. water becomes softer. The electrical conductivity also decreases. The color value decreases by more than two times because of the collapse of humic acid molecules into free radicals, which precipitate. Because of intense cavitation microbiological impurities, such as bacteria, spores and viruses are almost completely neutralized in the water. Any water treatment process consists of conversion of substances dissolved in the water into insoluble substances or gases, and their subsequent removal (Kumar, J. K. Cavitation—a New Horizon in Water Disinfection. Water disinfection by ultrasonic and hydrodynamic cavitation/Verlag: VDM, 2010.—304 p. Gogate, R. P. Application of cavitational reactors for water disinfection: Current status and path forward//journal of Environmental Management.—2007.—Vol. 85.—P. 801-815. Inactivation of Food Spoilage Microorganisms by Hydrodynamic Cavitation to Achieve Pasteurization and Sterilization of Fluid Foods/P. J. Milly [et al.]//journal of Food Science.—2007.—Vol. 72, No. 9.—P. 414-422. Arrojo, S. A Parametrical Study of Disinfection with Hydrodynamic Cavitation/S. Arrojo, Y. Benito, A. Martinez//Ultrasonics Sonochemistry.—2007.—No. 15.—P. 903-908.).

Cavitation treatment of ethanol and alcohol beverages causes dissolution of impurities, decreases concentration of simple aldehydes and esters (acetaldehyde, methyl acetate, ethyl acetate, methanol, isopropanol, and other impurities) decreases, and precipitation by salts of heavy metals.

U.S. Patent Application No. 2013/0330454 to Mahamuni discloses a method and system for treatment of alcohol beverages. A process including ultrasonic processing by acoustic and hydrodynamic cavitation are applied to the beverage product in a controlled fashion so as to achieve a desired transformation thereon.

U.S. Patent Application No. 2016/0289619 to Mancosky disclosing the process of aging spirits to obtain aged liquors includes circulation of spirits through a cavitation zone. The method and apparatus obtain the same conversion of undesirable alcohols, flavor extraction and color as years of aging in an oak barrel.

WO Patent Application No. 2005/042178 to Lee et al. discloses an apparatus and method for the treatment of wine using ultrasonic technology. Ultrasonic cavitation is generated within the said wine thereby decontaminating wine.

In Russian patent RU2368657 (Denisov et al.) alcohol-containing liquid passes through the activator with turbulization part. After treatment of vodka in the activator, the content of Aldehydes, Fusel oils, Esters and Methyl Alcohol is decreased in it.

Hydrodynamic cavitation and subsequent filtration of alcohol beverages will increase the efficiency of the process of removing impurities from the liquid, reduce the load on the filter elements and increase their lifetime, and produce beverages with high organoleptic quality.

Preliminary cavitation treatment of drinking liquids sent for further purification on membranes and filters allows removing microbiological contaminants, reducing the amount of harmful chemicals, breaking up agglomerates of solid particles, grinding solid particles to micro- and nano-size. Reduction in the concentration of living microflora, solid particles with sizes exceeding the pore size, and chemical impurities extends the life of filters and membranes without their regeneration or replacement.

The present invention fulfills these needs and provides other related advantages.

SUMMARY OF THE INVENTION

The invention discloses the method and the system of purification of drinking water, alcohol and alcohol beverages from microbiological and chemical contaminants, micro particles and colloidal particles. The method and device is based on the action of hydrodynamic cavitation on particles, colloidal particles, microbiological and chemical impurities. The fluid flow moves at a high rate to generate hydrodynamic cavitation features in the fluid flow to generate changes in the fluidic flow's velocity, pressure, temperature, chemical composition and physical properties in order to reduce the concentration of impurities and to increase the lifetime of membranes and filters for purification of liquids from microbiological, chemical and mechanical impurities.

The method comprises the application of purification of alcoholic beverages from microbiological and chemical contaminants, particles and colloidal particles flow-through hydrodynamic cavitation to a contaminated fluid flow and filtration under the porous septum. Preferably, the fluid is subjected to hydrodynamic cavitation on its own prior to the purification.

The multi-stage cavitation device in which the fluid flow is subject to hydrodynamic cavitation comprises an inlet sleeve provided with channels having both constrictions and expansions. The channels are preferably shaped as Venturi tubes. Before the channels having contractions and expansions, the fluid can be exposed to elements to create vortex flow.

The filter module can be designed as a standard cartridge for purifying liquids or installed in a single housing with the multi-stage cavitation device. For mechanical or sorption purification of liquids, various materials and substances in the form of loose, fibrous materials, flexible or rigid tubes and membranes can be used as filter elements in the filter module.

Accordingly, besides the objects and advantages of the high-speed fluid upgrading described herein, several objects and advantages of the present inventions are:

- To provide a method that provides a high-throughput combined with a high efficiency of purification.
- To provide an apparatus that promptly generates changes in a fluid flow's velocity, pressure, temperature, chemical composition and properties.
- To provide a compact apparatus for use as in an industrial plant and a domestic version at home.
- To provide a compact apparatus, in which cavitation facilitates destruction of contaminants.
- To provide a system that increases the efficiency of the porous septum and ensures long-term operation of the filtration system.
- To provide a system that increases organoleptic indices of alcoholic beverages.

The present invention is directed to reducing impurities affecting flavor, aroma and visual quality of alcohol beverages, increasing the lifetime of the filter systems for purification of alcoholic drinking liquids configured for essentially continuous operation. The purification system includes a pump, a multi-stage cavitation device and filtration module. The pump is configured to force a contaminated fluid through the system. The multi-stage cavitation device is fluidly connected to a fluid discharge from the pump. The multi-stage cavitation device may include a plurality of multi-stage cavitation devices, connected in series or in parallel. The filtration module is fluidly connected to a fluid discharge from the multi-stage cavitation devices.

The purification system may further include a receiving tank configured to receive and store fluid for treatment. The receiving tank is disposed upstream of the pump and fluidly connected to a fluid inlet on the pump. The filtration module can be connected to the tank for return of treated fluid to a new loop in the purification system or to an outlet for discharge of liquid with unfiltered impurities, particles and colloidal particles and to an outlet for discharge of purified liquid.

A process for treating contaminated fluid includes the steps of cavitating the contaminated fluid in a multi-stage cavitation device, and filtration of a treated fluid outlet. The process may also include the steps of storing a predetermined quantity of the untreated fluid in a receiving tank, and pumping the untreated fluid from the receiving tank to the multi-stage cavitation device.

The location of cavitating devices in the vicinity of the porous septum of the filter system will allow the cavitation bubbles to impact the colloidal particles, the associates of molecules, the molecules of impurities, and microorganisms accumulated on the porous septum. Hydrodynamic and acoustic effects of cavitation bubbles on the microfilm emerging on the surface of the membrane or microfilter prevent its formation and consolidation on the porous septum surface. This will allow using membranes and microfilters for a longer time without cleaning or replacement, reducing the load on the filter elements.

The present invention is directed to a method for the purification and improvement of organoleptic indicators of treatment liquids, including drinking water, ethanol and alcoholic beverages. The method begins with pumping a treatment liquid under pressure into a multi-stage cavitation device. The treatment liquid is processed in the multi-stage cavitation device to form a processed liquid. The processing includes generating hydrodynamic cavitation in the treatment liquid. The processed liquid is then purified through a filter module to form a purified liquid. The purifying includes reducing a concentration of contaminants, solid particles, and colloidal particles in the processed liquid. The purified liquid is discharged from the filter module.

The multi-stage cavitation device preferably has at least two cavitation stages, each cavitation stage comprising a helical plate and a cylinder body defining a central channel having a constriction and an expansion. The multi-stage cavitation device may include a plurality of multi-stage cavitation devices connected in series.

The processing of the treatment liquid includes generating hydrodynamic cavitation in the liquid by changing fluid velocity and fluid pressure within the multi-stage cavitation device. The hydrodynamic cavitation alters temperature, chemical composition and physical properties of the treatment liquid. The pumping, processing, and purifying steps may be repeated on the purified liquid one or more times before performing the discharging step.

A storage tank may be provided for containing the treatment liquid. The pumping step pumps the treatment liquid from the storage tank. The purified liquid may be returned to the storage tank after the purifying step, where the pumping, processing, and purifying steps are performed one or more times on the liquid in the storage tank before performing the discharge step.

A single housing may be provided that contains in sequence the multi-stage cavitation device and the filter module. The single housing preferably includes at least two cavitation stages and one filter module. Each cavitation stage includes a helical plate and a cylinder body defining a central channel having a constriction and an expansion. The filter module includes an annular cylindrical insert surrounding a cylindrical filter element.

The annular cylindrical insert preferably defines a plurality of annular bulges forming contractions and expansions in a gap between the annular cylindrical insert and the cylindrical filter element. The processed fluid is preferably cavitated in the gap between the annular cylindrical insert and the cylindrical filter element so as to prevent and remove blockages of the filter element.

The alcoholic beverage may include vodka, brandy, whiskey, rum, gin, wine, and aqueous solutions of natural or synthetic alcohols. The alcoholic beverages may be crude, filtrated, or purified. The drinking water may be tap water, artesian water, well water, spring water, lake water, or fresh water.

The present invention is also directed to a system for purification and improvement of organoleptic indicators of treatment liquids, including drinking water, ethanol and alcoholic beverages. The system preferably includes a high-pressure pump fluidly connected to a multi-stage cavitation device, which is in turn fluidly connected to a filter module. The system may also include a storage tank fluidly connected to the high-pressure pump as a supply of treatment fluid. The filter module may be fluidly connected to the storage tank so as to recycle the processed treatment fluid. A secondary pump may be included between and fluidly connected to both the multi-stage cavitation device and the filter module. A drain valve may be included between the storage tank and the high-pressure pump so as to selectively remove liquids from the storage tank.

The multi-stage cavitation device preferably has an inlet fluidly connected to the high-pressure pump. The multi-stage cavitation device has at least two cavitation stages, each cavitation stage comprising a helical plate and a cylinder body defining a central channel having a constriction and an expansion. The multi-stage cavitation may be a plurality of multi-stage cavitation devices connected in series. A single housing may contain the multi-stage cavitation device and the filter module as a single unit, wherein the filter module comprises an annular cylindrical insert surrounding a cylindrical filter element.

The annular cylindrical insert preferably defines a plurality of annular bulges forming contractions and expansions in a gap between the annular cylindrical insert and the cylindrical filter element. The filter module may include a cartridge containing loose filter or adsorbent material, fibrous material, rigid or flexible porous tubes or membranes.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
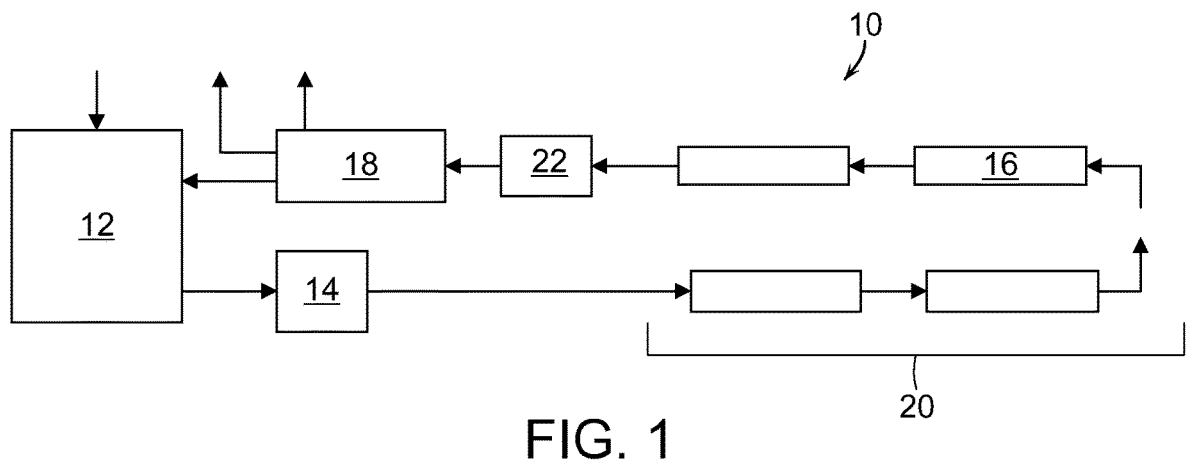
FIG. 1 illustrates in flow chart form the scheme of the system for purification of alcoholic beverages of impurities.
Figure 2:
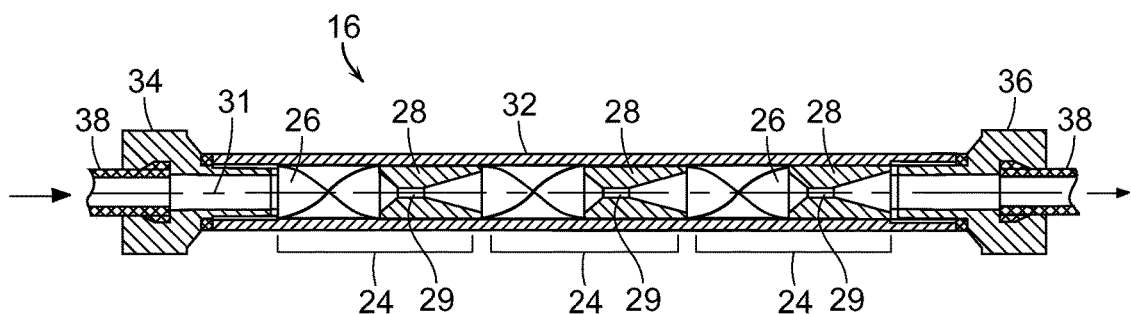
FIG. 2 illustrates a preferred embodiment of the multi-stage cavitation device.
Figure 3:
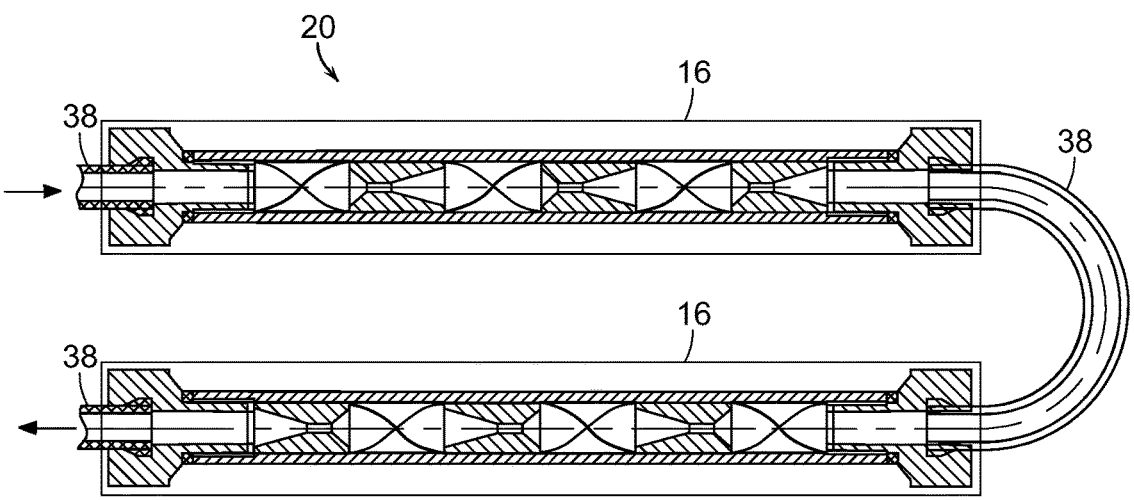
FIG. 3 illustrates a pair of multi-stage cavitation devices arranged in series.

A principal diagram of a possible system for purification 10 of drinking water, aqueous solutions of alcohols and alcohols is depicted in FIG. 1. The purification system 10 is comprised of the several parts that make it possible to efficiently treat of alcoholic beverages and remove various contaminants there from by using filtration. The system 10 consists of inlet tank 12, which is filled with fluid to be purified. A high-pressure pump 14 feeds the fluid to multi-stage cavitation device 16 (FIG. 2) or to the set of cavitation devices 20 (FIG. 3) for the cavitation treatment of the fluid. The set of cavitation devices 20 may comprise 2, 3, 4, or more devices as needed. To provide the required pressure drop necessary for the filtration process, an additional pump 22 may be installed upstream of the filter module 18 to increase the pressure in the fluid flow to the required level. The filtration module 18 provides filtration on the fluid to be purified.

Multi-stage cavitation device 16 comprises several stages or regions 24 to generate cavitation in the fluid stream. A region 24 for generating cavitation may consist of elements such as a twisted plate 26 to form a spiral element to tighten the flow of liquid and a work piece in the form of a cylinder 28 with a central channel 29 having a constriction and expansion of the passage section of the fluid flow for inception of cavitation. The constriction and expansion of the passage section of the fluid flow of the central channel 29 is preferably designed in the form of Venturi tube. The cavitation stages 24 are installed in a housing 32. Feeding and discharge of the treated liquid is done through inlet 34 and the outlet 36 installed on the housing 32.

In the multi-stage cavitation device 16 (FIG. 2), macro vortexes are generated in the fluid flow, by both the twisted plate 26 and cylinder 28, which are accompanied by local pressure decreases to the saturated vapor point of the fluid at the given temperature. When this happens, the proper conditions for the growth of cavitation nuclei in the cavitation bubbles are reached. The formed cavitation bubbles pulse and implode in downstream high-pressure zones.

Stages 24 for generating cavitation is installed in the housing 32. Multi-stage cavitation device 16 can be arranged in the set of cavitation devices 20 (FIG. 3) connected between pump 14 and filter unit 18 (or pump 22 when needed) by means of piping 38. A filter module 18 can be installed in the form of a standard cartridge for quick replacement. In the design of the filter module 18, various materials and substances can be used for mechanical or sorption purification of liquids in the form of loose, fibrous materials, flexible or rigid tubes and membranes.

The filter module 18 can work in a dead-end mode, where a contaminated fluid passes through a special pore-sized microfilter or membrane to separate suspended particles from the process liquid, or in a cross-flow mode of filtration, i.e. in the presence of a flow of fluid moving along the membrane surface and jetting the discharge of contaminated liquid.

Figure 4:
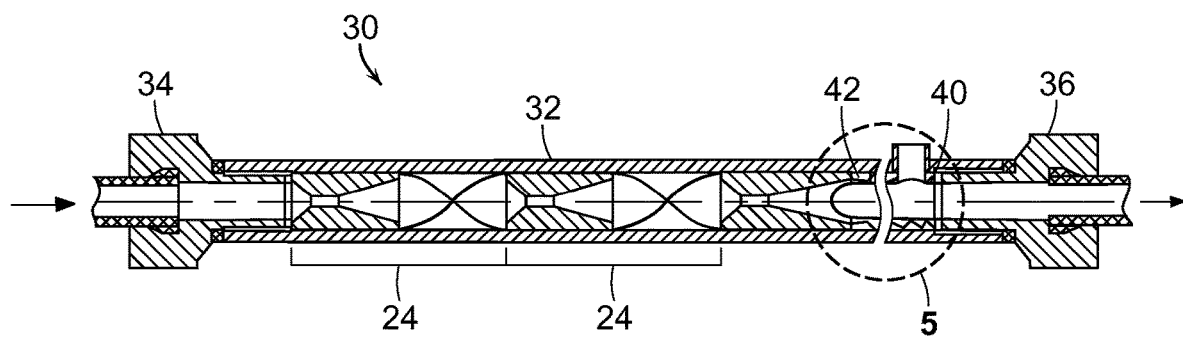
FIG. 4 illustrates the combined multi-stage cavitation device and filter module located in a common housing.

The micro filter or membrane module 18 may also be installed in a single housing together with a cavitation device 16 to increase the cleaning efficiency of the filter surface, as shown in FIG. 4. The combined cavitation and filter module 30 installed in a single housing 32 consists of a multi-stage cavitation device 16 and a filter element or membrane 40 similar to the filter module 18. To work in dead-end mode, the device 30 has one inlet 34 and one outlet 36. To work in a cross-flow filtration mode the device 30 has one inlet 34 and two outlets: the purified outlet 36 is used for discharge of purified liquid, and the waste outlet 46 is designed to discharge liquid with colloidal particles and chemical impurities out of the device 30 (FIG. 5).

Figure 5:
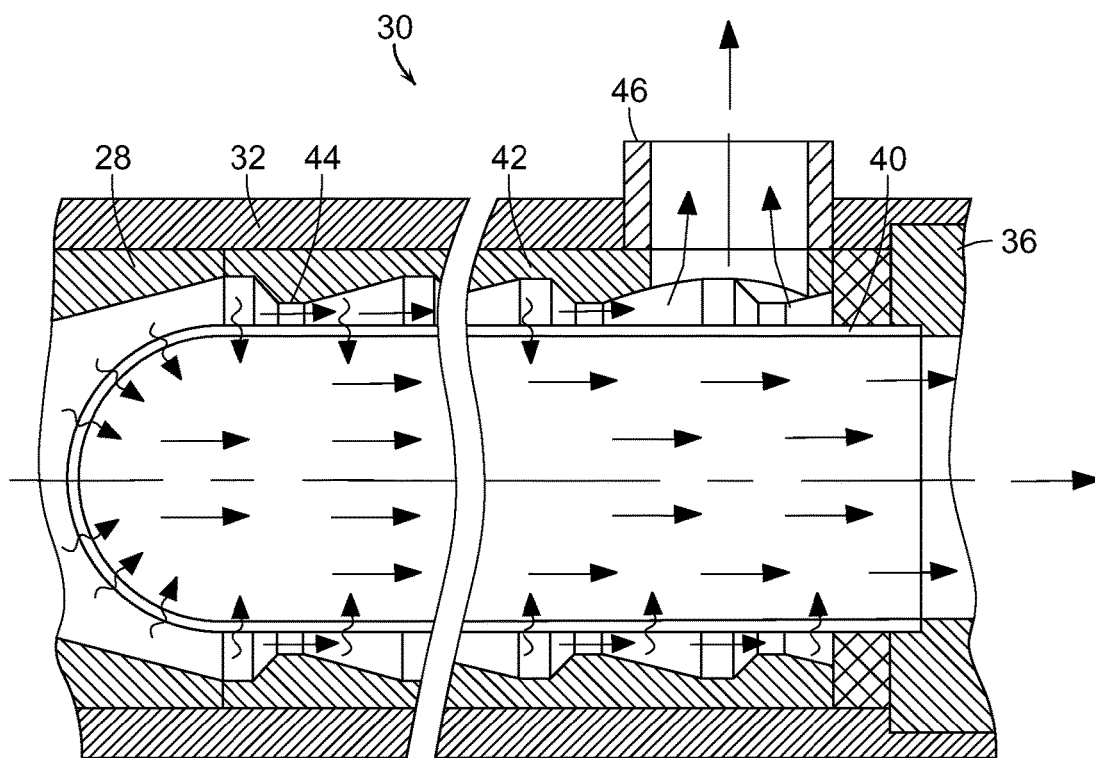
FIG. 5 is a close-up view of the filter module of FIG. 4 in circle 5.
Figure 6:
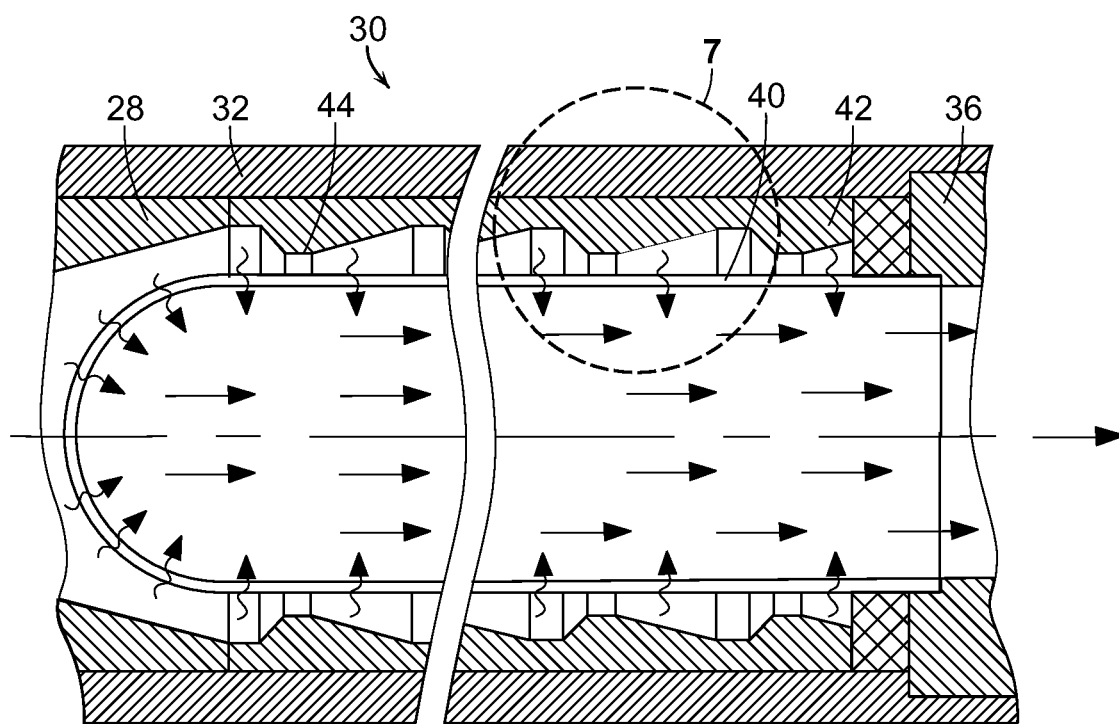
FIG. 6 is a close-up view of an alternate embodiment of a filter module located in a common housing with the multi-stage cavitation device.

In the housing 32, in the zone of the filter element 40, a cylindrical insert 42 can be mounted, with bulges 44 on its inner surface to provide turbulence of the treated fluid as it flows along the filtering surface (FIGS. 5-6).

Figure 7:
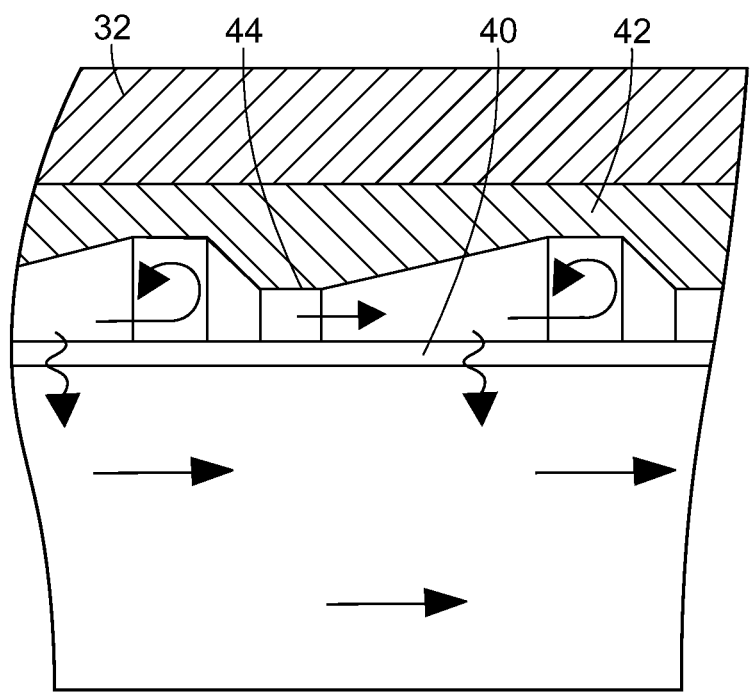
FIG. 7 is a close-up view of the gap between body and porous septum of the combined cavitational and filtering device of FIG. 6 in circle 7.
Figure 8:
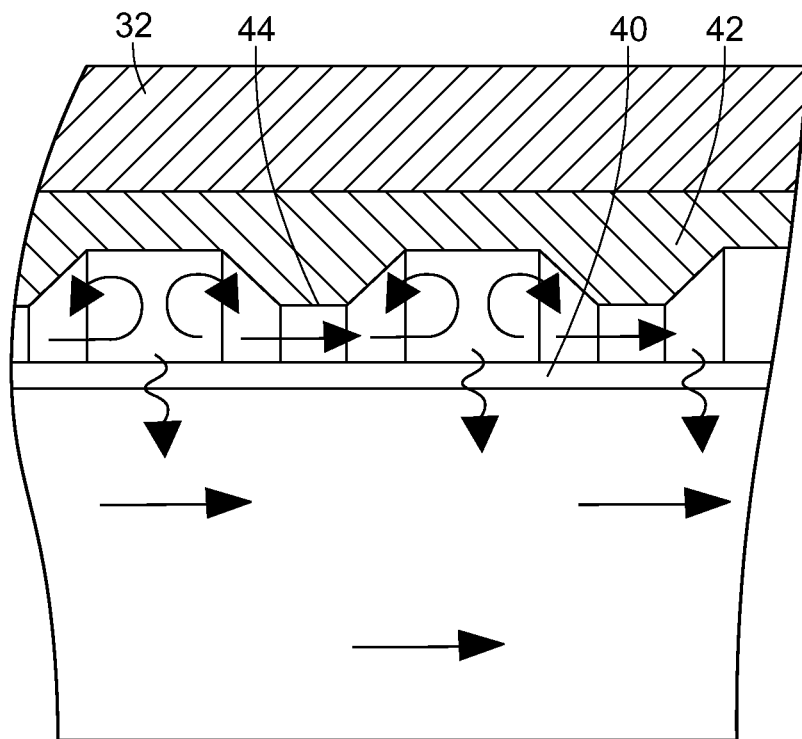
FIG. 8 is a close-up view of an alternate embodiment of the gap between body and porous septum of the combined cavitational and filtering device of FIG. 6 in circle 7.
Figure 9:
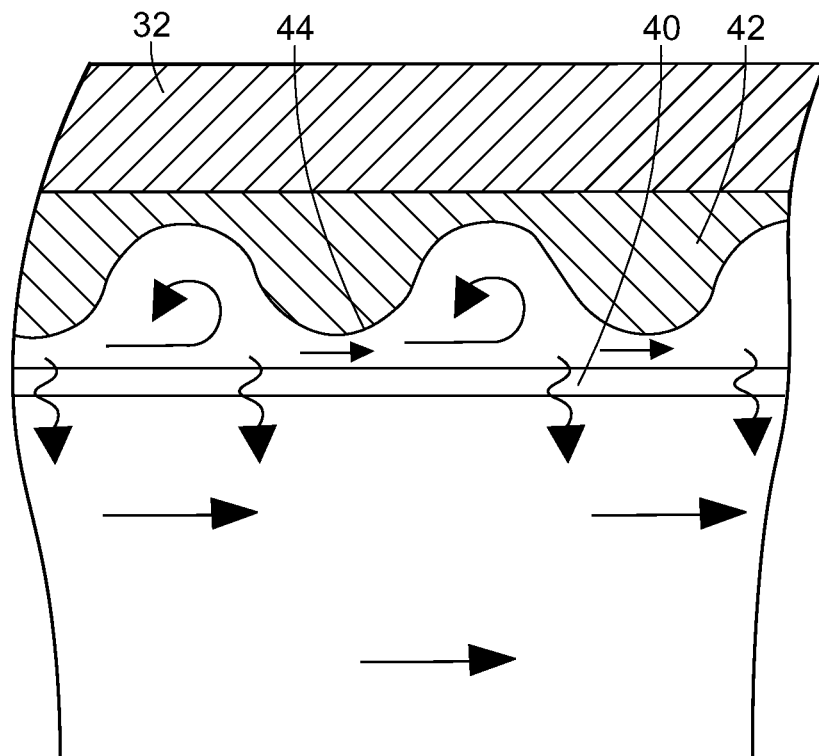
FIG. 9 is a close-up view of an alternate embodiment of the gap between body and porous septum of the combined cavitational and filtering device of FIG. 6 in circle 7.

The shape of an annular section of bulges 44 for turbulent flow may have an angular or rounded profile, forming the constrictions and the subsequent expansion of the flow section for liquid flow, as shown in FIGS. 7-9. The shape of the annular section of bulges 44 can have a surface profile of a Venturi tube, as shown in FIGS. 7 and 8. Alternatively, bulges 42 can have an undulating profile as shown in FIG. 9.

Figure 10:
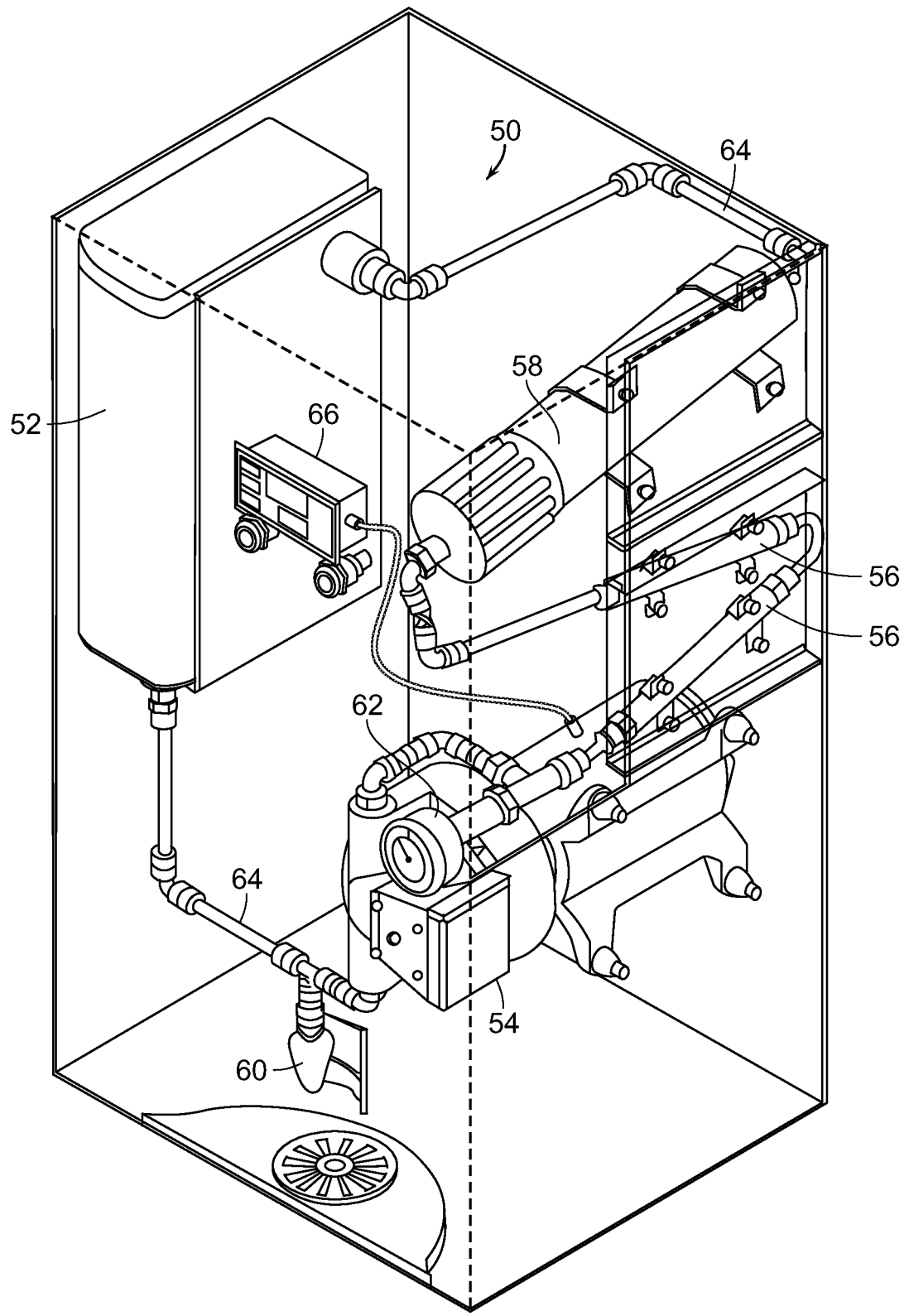
FIG. 10 is a partial cut-away, isometric drawing of a device for purification of alcoholic beverages in table-top version for use at home.

The system 10 for purification of drinking water, ethanol and alcohol beverages of impurities can be made in an industrial version for high performance and a table-top version for use at home. A preferred embodiment of the table-top version of the device 50 for purification and improvement of the quality of alcohol beverages is shown in isometric view in FIG. 10.

The table-top version of the device 50 for purification and improvement of the quality of drinking water, ethanol and alcohol beverages comprises a liquid filling tank 52. The tank 52 preferable has a capacity of 0.2-1.0 gallons in volume. A pump 54 is connected to the tank 52 for transfer of the liquid to be treated to one or more multi-stage cavitation devices 56, with multiple devices preferably connected in series. A filter cartridge 58 is connected to the outlet from the last of the cavitation device 56 to remove microbiological and chemical impurities, as well as solid and colloidal particles from the liquid. The outlet of the filter cartridge 58 is preferably connected back to the tank 52.

The table-top device 50 preferably has an outlet valve 60 to control fluid flow in multiple processing modes, whether to dispense purified liquid, or to rinse and drain washing water from the system. To control the fluid pressure at the outlet of the pump 54, a manometer 62 is provided. The piping system 64 is preferably made of standard fittings and flexible tubes. The operation of the device 50 is controlled through an electronic control system 66 that is operationally connected to pump 54. The table-top device 50 has no analogues for purification and improvement of the quality of drinking water and alcoholic beverages at home.

Looking at FIG. 1, the inventive purification system 10 functions as follows. Fluid to be treated enters the tank 12 and then is transferred by the pump 14 to the cavitation device 16 or the series of cavitation devices 20. The cavitation bubbles generated in the fluidic flow in each cavitation device 16 pulsate and implode, resulting in heat and mass transfer processes and destruction of contaminants and pathogens. The fluid is then transferred from the cavitation device 16 or the set of cavitation devices 20 to filtration module 18. A secondary pump 22 may be used prior to the filtration module 18 as necessary to increase the fluid pressure through the filtration module 18.

Under the action of cavitation on the fluid, colloids and particles which can contain bacteria and viruses are dissolved. The pathogens are deprived of protection under chemical and physical effects of cavitation. Intense shock waves, cumulative fluid jets during collapse of cavitation bubbles cause the death of bacteria and viruses.

In the filtration module 18, an alcohol beverage is purified to remove microparticles and colloid particles, whose dimensions are larger than the pores of the microfilter or membrane. In the filtration module 18, drinking water is purified to remove dead bacteria and viruses, solid particles, and colloidal particles having dimensions larger than the pores of the microfilter or membrane.

After cavitation treatment, the particles to be removed generally have an average size smaller than that which existed before cavitation. The microflora does not emit waste products and does not emit substances that contribute to agglomeration of particles on the surface and in the pores of the microfilter membrane, so as to prevent or delay blockage of the membrane. The liquid may circulate from the filter module 18 back into the tank 12 in a closed circuit, where it can then be removed from the purification system 10. Alternatively, the purified liquid may be discharged from the filter module 18 via an outlet pipe.

When the treated fluid flows into the multi-stage cavitation device 16, it passes through the inlet 34 and successively passes through each cavitation generating stage 24 and then be discharged from the multi-stage cavitation device 16 through the outlet 36. At each stage 24, the liquid first flows around the helical plate 26 and then passes through the cylinder 28 with a central channel 29. As the liquid flows relative to the surface of the helical plate 26, the liquid swirls. The swirling flow passes through the central channel 29 of the cylindrical body 28, the channel 29 having a constriction in the form of a nozzle and an expansion in the form of a diffuser or the overall shape of a Venturi tube, in which cavitation is generated. The swirling flow passes through the central channel 29 at a higher a higher velocity than a comparable flow with streamlines parallel to the central axis 31. The high flow velocity in the zone of the channel 29 with a minimum flow area or throat of the Venturi tube causes reduction in the flow pressure to the saturated vapor pressure and the formation of cavitation bubbles that pulsate and collapse when they enter the zone of increased pressure in the diffuser or at the outlet of the Venturi tube.

The collapse of cavitation bubbles produces enough energy for the dissociation of water, alcohol and other molecules followed by the generation of protons, hydroxyl ions, hydroxyl radicals, peroxide and hydrogen molecules. Gas molecules present in these bubbles are excited and affected by multiple energy and charge exchange processes. Oxygen and hydrogen molecules participate in a number of reactions, including the formation of hydroperoxyl radicals.

Alcoholic beverages based on an aqueous solution of alcohol (vodka, brandy, whiskey, rum, gin and others), as well as food ethanol may contain impurities such as Acetaldehyde and/or Acetal, Benzene, Methanol, Fusel Oils, as Isobutyl, Isoamyl and active Amyl, Non Volatile Matter, Heavy Metals and others. The presence of these impurities in alcohol-containing beverages reduces their flavor and aroma qualities. Cavitation treatment of alcohol beverages and ethanol causes destruction of impurities, decreases the concentration of Acetaldehyde, Acetal, Benzene, Methanol, Fusel Oils, precipitation of salts of heavy metals, thus helping to improve the organoleptic indicators of alcohol beverages.

When the purification system 10 is in operation, a portion of the cavitation bubbles from the cavitation device 16 is moved by the liquid flow into the filter module 18. The cavitation bubbles come to the surface of the microfilter or membrane and collapse. When cavitation bubbles collide, pressure waves are generated, and cumulative jets are released towards the surface of the microfilter or membrane. Pressure pulsations and cumulative jets destroy contaminants that can be deposited on the surface of the microfilter or membrane.

In a combined cavitation and filter device 30, cavitation bubbles are formed both in the cavitation stages 24 and in the areas of bulges 44 for turbulent flow of the treated liquid as it flows along the filtering surface of the microfilter or membrane 40.

When the fluid flows in the gap between the insert 42 and the filter element 40, the constrictions and expansions caused by the bulges 44 create eddies, which generate hydrodynamic pressure pulsations and cavitation. The subsequent collapse of cavitation bubbles generates pressure waves, and releases cumulative jets towards the surface of the micro filter or membrane.

Pressure pulsations and cumulative streams prevent solid and colloidal particles, molecular associates and molecules of various impurities from forming a contaminant film on the surface of the filter elements. Removing contamination from the surface of the microfilter or membrane can increase the service life and reduce the load on the filter elements. As the surface of the filter element is kept clean, without accumulated contaminations, the filter element operates for a long time at the minimum design pressure. This makes it possible to increase the operating time of the filter element until it needs to be replaced or cleaned.

The combined cavitational and filtering device 30 can operate both in the dead-end mode (FIG. 6) and in the cross-flow mode of filtration (FIG. 5). When working in the dead-end mode, the liquid to be treated is fed into the inlet 34 of the combined device 30, passes through the cavitation generation stages 24, is filtered through the filter element 40, and is discharged from the device 30 through the outlet 36.

When operating in a cross-flow mode, the processed liquid is fed through inlet 34 of the combined device 30, passes through the cavitation generating stages 24, is filtered through the filter element 40, and the purified liquid is discharged from the device 30 through the outlet 36. The liquid with particles, colloidal particles and chemical impurities is discharged from the device through the waste outlet 46. The cross-flow mode is the most efficient operating regime for combined cavitational and filtering device 30, since the flow velocity in the gap between the body and porous septum of the combined device 30 is large, the flow has a developed turbulence and cavitation, which prevents the deposition of contaminants on the surface of the filter element 40.

The inventive purification system 50 functions as follows. An alcoholic beverage is poured into a container 52 and then is transferred by the pump 54 to the series-connected multi-stage cavitation devices 56. The cavitation bubbles generated in the fluidic flow pulsate and implode resulting in heat and mass transfer processes and destruction of contaminants. The fluid is then transferred from the final multi-stage cavitation device 56 to the filtration cartridge 58. Alternatively, the combined cavitational and filtering device 30, may replace the series connected multi-stage devices 56 and filtration cartridge 58.

In a filtration cartridge 58, a fluid is purified of particles and colloidal particles, whose dimensions are larger than the pores of the microfilter or membrane. After purification in the filter cartridge 58, the fluid may be removed from the tank 52 of the purification system 50 directly through the outlet valve 60. The liquid can also circulate from the filter cartridge 58 back into the tank 52 in a closed circuit and then be removed from the purification system 50 as described.

Example 1

Raw vodka in a volume of 1 liter was poured in the top-table device for purification of alcohol-containing beverages. Vodka was subject to the cavitation treatment and purified through the filter module in the form of a cartridge filled with activated carbon in a cyclic mode for 12 minutes. The pressure at the outlet of the pump was 140 psi, the flow was 2.7 liters per minute. Impurities were determined using FFAP column chromatography.

Table 1 shows that the amount of chemical impurities in vodka decreased by an average of 5%. The harsh smell of vodka dissipated, and its taste became softer.

TABLE 1

| Impurity | Concentration, milligram/liter | |
| --- | --- | --- |
| | Before treatment | After treatment |
| Acetaldehyde | 1.0632 | 1.0126 |
| Methyl acetate | 0.911 | 0.847 |
| Ethyl acetate | 0.882 | 0.859 |
| Isopropanol | 1.098 | 1.049 |

Example 2

Artesian water in the volume of 2 liters was poured in the top-table device for purification of water. The water was cavitated and purified through a filter module in the form of a cartridge filled with activated carbon in a cyclic mode for 20 minutes. The pressure at the pump outlet was 135 psi, the flow was 2.5 liters per minute.

Table 2 shows indicators of artesian water before and after processing in the device for cavitation treatment and water purification.

TABLE 2

| Parameter | Before treatment | After treatment |
| --- | --- | --- |
| Hydrogen index, pH | 7.3 | 7.9 |
| Solid residual, mg/L | 690 | 320 |
| Water hardness, mg-eq/L | 6.8 | 3.2 |
| Ferrum, mg/L | 2.8 | 0.24 |
| Manganese, mg/L | 1.8 | 0.1 |
| Chlorides, mg/L | 115 | 39.5 |
| Sulfates, mg/L | 210 | 24 |
| Fluorides, mg/L | 2.5 | 0.9 |

As can be seen from Table 2, the amount of contaminants in artesian water significantly decreased. Hydrogen index increased due to the cavitation treatment of water, destruction of water molecules and increase in the concentration of hydrogen peroxide in water.

Although several embodiments have been described in detail for purposes of illustration, various modifications may be made without departing from the scope and spirit of the invention. Accordingly, the invention is not to be limited, except as by the appended claims.

What is claimed is:

1. A method for the purification and improvement of organoleptic indicators of a treatment liquid selected from the group consisting of drinking water, ethanol and alcoholic beverage, comprising the steps of:

providing a single housing comprises in sequence a multi-stage cavitation device and a filter module, wherein the single housing comprises at least two cavitation stages in the multi-stage cavitation device and one filter module, each cavitation stage comprising a helical plate and a cylinder body defining a central channel having a constriction and an expansion, the filter module comprising an annular cylindrical insert surrounding a cylindrical filter element;

pumping the treatment liquid under pressure into the multi-stage cavitation device;

processing the treatment liquid in the multi-stage cavitation device to form a processed liquid, wherein the processing step comprises generating hydrodynamic cavitation in the treatment liquid;

purifying the processed liquid through the filter module to form a purified liquid, wherein the purifying step comprises reducing a concentration of contaminants, solid particles, and colloidal particles in the processed liquid; and discharging the purified liquid from the filter module.

2. The method of claim 1, wherein the multi-stage cavitation device comprises a plurality of multi-stage cavitation devices connected in series.

3. The method of claim 1, wherein the hydrodynamic cavitation alters temperature, chemical composition and physical properties of the treatment liquid.

4. The method of claim 1, further comprising the step of repeating the pumping, processing, and purifying steps on the purified liquid before performing the discharging step.

5. The method of claim 1, further comprising the step of providing a storage tank containing the treatment liquid, wherein the pumping step pumps the treatment liquid from the storage tank.

6. The method of claim 5, further comprising the step of returning the purified liquid to the storage tank and performing the pumping, processing, and purifying steps on the purified liquid before performing the discharge step.

7. The method of claim 1, wherein the annular cylindrical insert defines a plurality of annular bulges forming contractions and expansions in a gap between the annular cylindrical insert and the cylindrical filter element.

8. The method of claim 7, further comprising the step of cavitating the processed fluid in the gap between the annular cylindrical insert and the cylindrical filter element so as to prevent and remove blockages of the filter element.

9. The method of claim 1, wherein alcoholic beverage as the treatment liquid is selected from the group consisting of vodka, brandy, whiskey, rum, gin, wine and aqueous solutions of natural or synthetic alcohols.

10. The method of claim 1, wherein the alcoholic beverages are crude, filtrated, or purified.

11. The method of claim 1, wherein drinking water as the treatment liquid is selected from the group consisting of tap water, artesian water, well water, spring water, lake water, or fresh water.

* * * * *